(12) United States Patent
Kodama et al.

(10) Patent No.: US 9,004,332 B2
(45) Date of Patent: Apr. 14, 2015

(54) CUP HOLDER

(71) Applicants: Toyoda Gosei Co., Ltd., Kiyosu-shi, Aichi-ken (JP); Kojima Co., Ltd., Kariya-chi, Aichi-ken (JP)

(72) Inventors: Yasuhiro Kodama, Kiyosu (JP); Naoyuki Fukui, Kiyosu (JP); Daiichiro Nakano, Kariya (JP); Makoto Yokota, Kariya (JP)

(73) Assignees: Toyoda Gosei Co., Ltd., Aichi-pref. (JP); Kojima Co., Ltd., Kariya-shi, Aichi-ken (JP)

(*) Notice: Subject to any disclaimer, the term of this patent is extended or adjusted under 35 U.S.C. 154(b) by 96 days.

(21) Appl. No.: 13/752,464

(22) Filed: Jan. 29, 2013

(65) Prior Publication Data

US 2013/0256351 A1    Oct. 3, 2013

(30) Foreign Application Priority Data

Mar. 30, 2012  (JP) .................................. 2012-079521

(51) Int. Cl.
*B60R 7/00*     (2006.01)
*B62J 11/00*    (2006.01)
*B60N 3/10*     (2006.01)

(52) U.S. Cl.
CPC ........ *B60N 3/10* (2013.01); *B60N 3/106* (2013.01); *Y10S 224/926* (2013.01)

(58) Field of Classification Search
CPC .............................. B60N 3/106; B60N 3/102
USPC ........................... 224/544, 926, 414; 220/737
See application file for complete search history.

(56) References Cited

U.S. PATENT DOCUMENTS

| | | | | |
|---|---|---|---|---|
| 5,782,448 | A  * | 7/1998 | Withun et al. | 248/311.2 |
| 7,380,762 | B2 * | 6/2008 | Takeichi | 248/311.2 |
| 7,413,244 | B2 * | 8/2008 | Tanaka et al. | 296/198 |
| 7,789,265 | B2 * | 9/2010 | Kearney et al. | 220/737 |
| 8,353,495 | B2 * | 1/2013 | Ogura | 248/311.2 |
| 2004/0118860 | A1 * | 6/2004 | Leopold et al. | 220/737 |
| 2004/0129747 | A1 * | 7/2004 | Maierholzner | 224/544 |
| 2005/0279752 | A1 * | 12/2005 | Harada | 220/759 |
| 2007/0075205 | A1 * | 4/2007 | Shin et al. | 248/311.2 |
| 2009/0146035 | A1 * | 6/2009 | Kaemmer | 248/313 |

FOREIGN PATENT DOCUMENTS

JP    3725505 B2    12/2005
JP    3137651 U     12/2007

* cited by examiner

*Primary Examiner* — Brian D Nash
*Assistant Examiner* — Derek Battisti
(74) *Attorney, Agent, or Firm* — Posz Law Group, PLC (57) ABSTRACT

A cup holder includes one or two supporting members that support a container inserted into a receiving portion of a holder main body, and is arranged in a circumferential direction of the holder main body. A container having the protrusion and recess pattern on a side surface can smoothly be taken out from the receiving portion with a low risk of the supporting members interfering with other members around the holder main body.

4 Claims, 4 Drawing Sheets

CUP HOLDER

TECHNICAL FIELD

The present invention relates to a cup holder provided in a passenger compartment of an automobile for retaining a beverage container and the like in a stable state.

BACKGROUND ART

A cup holder for retaining a beverage container and the like in a stable state is equipped in a passenger compartment of an automobile. As such a cup holder, ones having a supporting member capable of supporting a side surface of the container inserted into a receiving portion of a holder main body are known. Typically, in the cup holder having the supporting member, the container such as a PET bottle having various dimensions and shapes that is inserted into the receiving portion can be retained in the stable state by the supporting member advancing into the receiving portion. Further, the container such as the PET bottle can be taken out from the receiving portion as a result of the supporting member retracting from the receiving portion.

Figure 6:
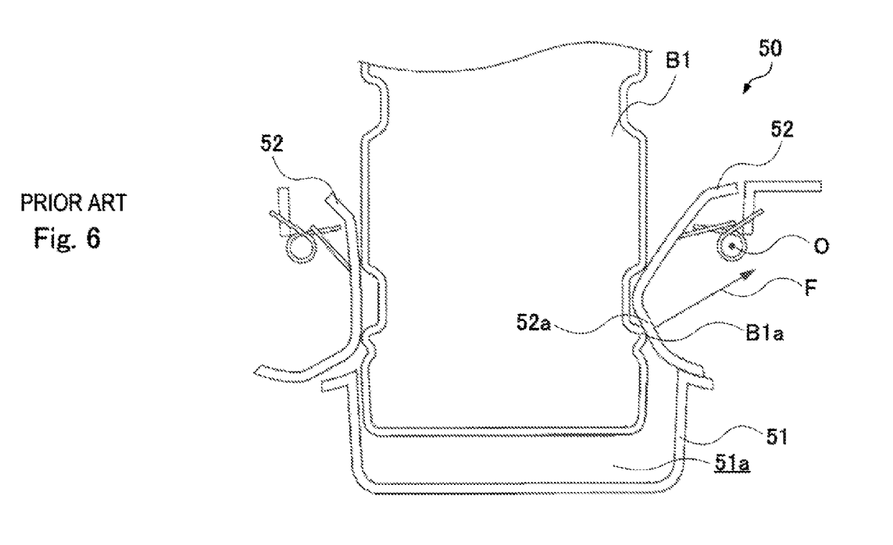
FIG. 6 is a cross sectional diagram of a cup holder having conventional supporting members.

As shown in FIG. 6, a cup holder 50 disclosed in Japanese patent No. 3725505 includes a holder main body 51 having a receiving portion 51a into which a beverage container B1 is to be inserted, and supporting members 52 capable of advancing into and retracting from the retaining portion 51a of the holder main body 51. Each of the supporting members 52 is provided capable of rotating with an axial line O along a horizontal direction as a center, and is biased such that its portion lower than the axial line O advances into the receiving portion 51a. When the beverage container B1 having a protrusion and recess pattern on a side surface is to be taken out from the receiving portion 51a, a protrusion B1a of the beverage container B1 makes contact with guide portions 52a of the supporting members 52. Each of the guide portions 52a has a shape with which a force F from the protrusion B1a acting on the guide portion 52a is oriented toward a lower side than the axial line O. With the force F being oriented toward the lower side than the axial line O, a moment is exerted on the supporting members 52 in a direction that causes the guide portions 52a to retract from the receiving portion 51a (a counter-clockwise moment). Due to this, the beverage container B1 having the protrusion and recess pattern on the side surface can smoothly be taken out from the receiving portion 51a of the holder main body 51.

Figure 7A:
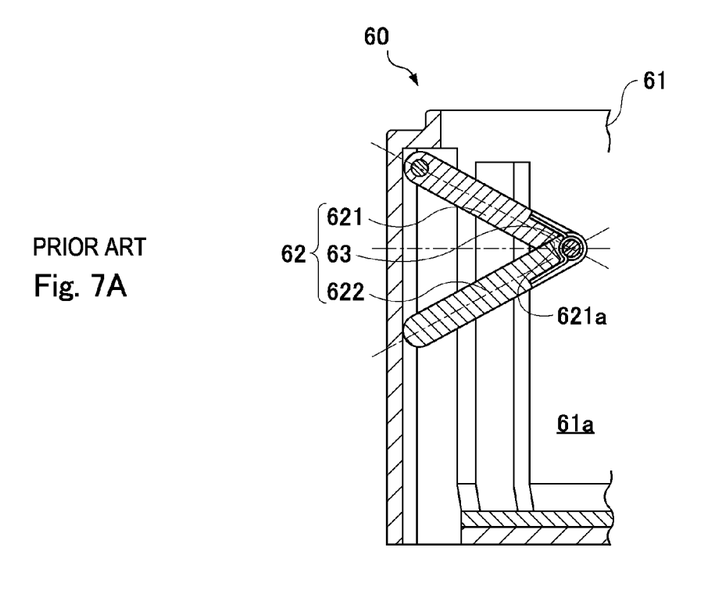
FIG. 7A is a cross sectional diagram of a cup holder having another conventional supporting member, and shows a state in which the supporting member is at a most advanced position where the supporting member is advanced to the maximum into a receiving portion.
Figure 7B:
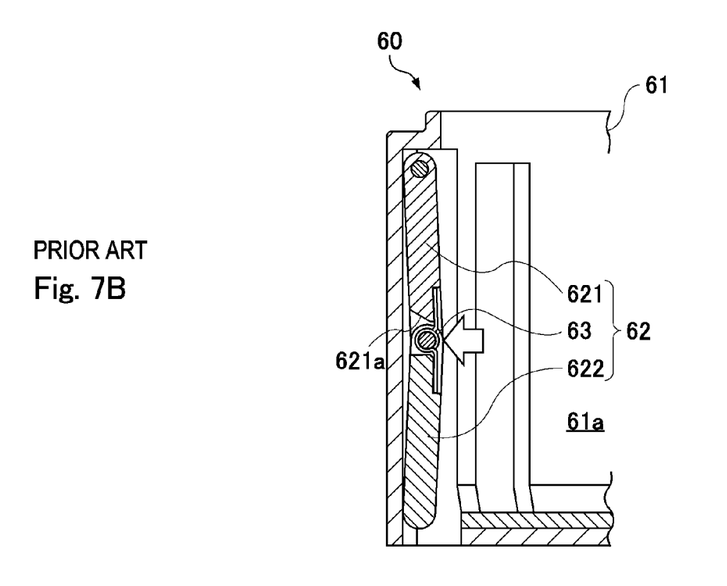
FIG. 7B is a cross sectional diagram of the cup holder having the above another conventional supporting member, and shows a state in which the supporting member is retracted from the most advanced position.

As shown in FIG. 7A and FIG. 7B, a cup holder 60 disclosed in Japanese utility model No. 3137651 includes a holder main body 61 having a receiving portion 61a into which a beverage container is to be inserted, and a supporting member 62 capable of advancing into and retracting from the receiving portion 61a of the holder main body 61. The supporting member 52 is configured of an upper piece 621 having its upper end supported rotatably by a side portion of the holder main body 61, a lower piece 622 having its upper end linked rotatably to the upper piece 621 and its lower end sliding on the side portion of the holder main body 61 in an up and down direction, and a spring 63 that is attached to a linking portion of the upper piece 621 and the lower piece 622 and that biases the linking portion to advance in a direction approaching a center axis of the holder main body 61. A stopper surface 621a that restricts a rotation of the lower piece 622 relative to the upper piece 621 to be within a predetermined range is formed at a lower end of the upper piece 621. When the beverage container is inserted into the receiving portion 61a, the linking portion of the upper piece 621 and the lower piece 622 is pressed by a side surface of the beverage container, and the supporting member 62 is retracted to a position shown in FIG. 7B from its most advanced position shown in FIG. 7A.

SUMMARY OF INVENTION

Figure 5:
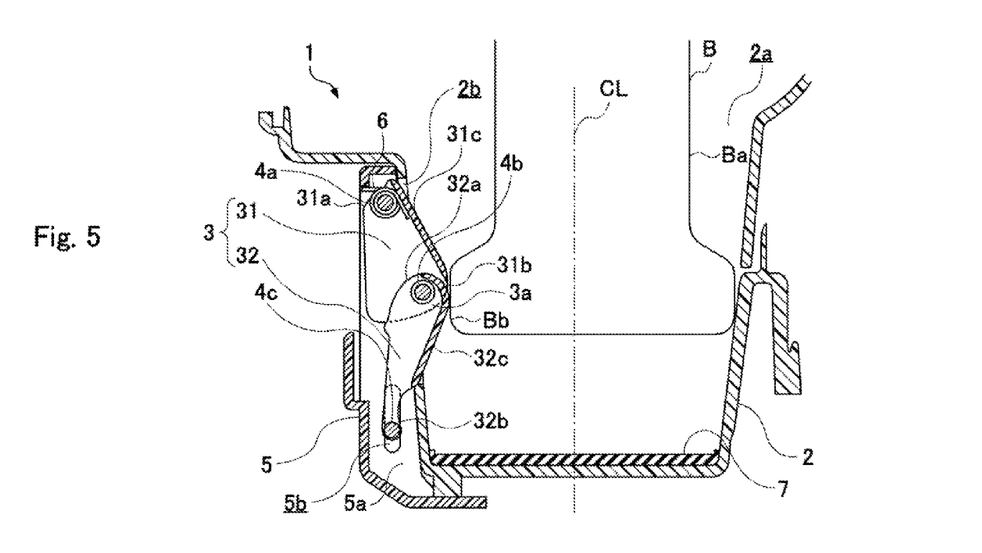
FIG. 5 is a cross sectional diagram of the cup holder of the embodiment, and shows a third state when the beverage container is taken out.

In the cup holder 50 shown in FIG. 5, the shape of the supporting members 52 is determined such that the beverage container B1 can smoothly be taken out from the receiving portion 51a of the holder main body 51 in accordance with the protrusion and recess pattern on the side surface of the beverage container B1 that is commercially available or to be manufactured. Accordingly, there is a problem that the shape of the supporting members 52 cannot be determined until the shape of the beverage container B1 becomes known.

Further, in the recent years, the protrusion and recess pattern on the side surface for example of the PET bottle is determined not only in view of ensuring strength, but also of design, easy grip and vulnerability to crushing and the like; thus, the protrusion and recess pattern on the side surface of the PET bottle is likely to further increase its variety. In the cup holder 50, since each of the supporting members 52 is of a single member, it is difficult to determine the shape of the supporting members 52 that enables retaining all of the PET bottles having a large variety of shapes in the stable state and further enables the PET bottle to be smoothly taken out. Further, since each of the supporting members 52 is of the single member, as shown in the left side of FIG. 6, a lower end of the supporting member 52 significantly protrudes outside of the holder main body 51 when the supporting member 52 significantly retracts from the receiving portion 51a. At this occasion, the lower end of the supporting member 52 might interfere with other members around the holder main body 51.

On the other hand, in the cup holder 60 shown in FIG. 7A and FIG. 7B, the supporting member 62 is configured of a two-link structure of the upper piece 621 and the lower piece 622. Due to this, the linking portion of the upper piece 621 and the lower piece 622 retracts from the receiving portion 61a of the holder main body 61 without the supporting member 62 being protruded outside of the holder main body 61. Accordingly, the supporting member 62 does not interfere with other members around the holder main body 61.

However, in the cup holder 60, a case of inserting a beverage container having protrusion and recess pattern on a side surface in the receiving portion 61a is not expected. Due to this, when the beverage container B1 shown in FIG. 6 is inserted into the receiving portion 61a of the holder main body 61, the protrusion B1a on the side surface of the beverage container B1 makes contact with a lower portion of the linking portion of the upper piece 621 and the lower piece 622 upon taking the beverage container B1 out from the receiving portion 61a. At this occasion, if an angle between the upper piece 621 and the lower piece 622 is an acute angle as shown in FIG. 7A, a direction of a force acting on the supporting member 62 from the beverage container B1 is oriented upward than a center of rotation of the upper end of the upper piece 621. Due to this, the protrusion B1a on the side surface of the beverage container B1 is caught at the linking portion of the upper piece 621 and the lower piece 622, and the beverage container B1 might not be able to be taken out smoothly from the receiving portion 61a of the holder main body 61.

The cup holder 50 shown in FIG. 6 has four supporting members 52 arranged in a circumferential direction of the holder main body 51. Further, the cup holder 60 shown in FIG. 7A and FIG. 7E has three supporting members arranged in a circumferential direction of the holder main body 61. Accordingly, in the case of arranging three or more supporting members on the holder main body, the side surface of the container inserted into the receiving portion of the holder main body can be supported only by the plurality of supporting members. On the other hand, in a case of arranging two or less supporting members on the holder main body, the side surface of the container inserted into the receiving portion of the holder main body is supported by the supporting members and an inner circumferential surface of the holder main body. Accordingly, in, the case of arranging two or less supporting members on the holder main body, an advancing amount of the respective supporting members into the receiving portion needs to be made larger than in the case of arranging three or more supporting members, so the above-described problems become more prominent. Due to this, the holder main body preferably has three or more supporting members arranged thereon. However, there are cases in which two or less supporting members are adopted in order to avoid interference with the other members around the holder main body and the supporting members.

The present invention has been created in, view of the above circumstance, and aims to provide a cup holder in which one or two supporting members that support a side surface of a container inserted into a receiving portion of a holder main body is arranged in a circumferential direction of the holder main body, by which the container having a protrusion and recess pattern on a side surface can smoothly be taken out from the receiving portion, and that has a small risk of the supporting members interfering with other members around the holder main body when the supporting members retract from the receiving portion.

Hereinbelow, respective configurations suitable for solving the problem will be described with additional description of working and advantageous effects and the like.

(1) A cup holder of the present invention includes a holder main body including a receiving portion that opens at an upper side and into which a container is to be inserted, one or two supporting members arranged in a circumferential direction of the holder main body and supporting a side surface of the container by advancing into the receiving portion, a restricting member and a biasing member. The supporting members include: a first supporting piece having an upper end arranged to be rotatable relative to the holder main body, and forming an upper structure of each supporting member; and a second supporting piece having an upper end linked to be rotatable relative to a lower end of the first supporting piece, and a lower end arranged to be rotatable relative to the holder main body and slidable in an up and down direction, and forming a lower structure of each supporting member. The restricting member restricts a sliding direction and an elevating height of the lower end of the second supporting piece. The biasing member biases a linking portion of the first supporting piece and the second supporting piece to advance in a direction approaching a center axis of the holder main body. Each supporting member operates such that the first supporting piece does not protrude downward in a direction approaching the center axis of the holder main body than the second supporting piece. When the lower end of the second supporting piece is elevated to the maximum and the linking portion is advanced to the maximum, an angle formed by a line from a rotational center of the linking portion to a rotational center of the upper end of the first supporting piece and a line from the rotational center of the linking portion to a rotational center of the lower end of the second supporting piece is an obtuse angle.

The protrusion and recess pattern on the side surface of the container is more likely to be caught by the supporting member as the linking portion of the first supporting piece and the second supporting piece advances in the direction approaching the center axis of the holder main body. Due to this, when the supporting member is at a most advanced position that is advanced to a maximum, it is most difficult to take out the container from the receiving portion of the holder main body. Here, according to the configuration of the present invention, the supporting member is configured of a two-link structure of the first supporting piece and the second supporting piece, and the supporting member operates such that the first supporting piece does not protrude downward in the direction approaching the center axis of the holder main body than the second supporting piece. Thus, when the container inserted in the receiving portion of the holder main body is taken out from the receiving portion, the side surface of the container makes contact with the second supporting piece from a lateral side or from a lower side, regardless of the protrusion and recess pattern on the side surface of the container. Further, according to the configuration of the present invention, when the lower end of the second supporting piece is elevated to the maximum and the linking portion is advanced to the maximum, the angle formed by the line from the rotational center of the linking portion to the rotational center of the upper end of the first supporting piece and the line from the rotational center of the linking portion to the rotational center of the lower end of the second supporting piece is an obtuse angle.

Thus, according to the present invention, in the event of taking out the container having the protrusion and recess pattern on the side surface from the receiving portion of the holder main body when the supporting member is at the most advanced position, the side surface of the container makes contact with the second supporting piece from the lateral side or from the lower side under a state in which the elevating height of the lower end of the second supporting piece is restricted by the restricting member. At this occasion, the second supporting piece moves to rotate around a rotational center of the lower end of the second supporting piece, regardless of a direction of a force acting on the second supporting piece from the container. Further, a force that is perpendicular and upward relative to the line from the rotational center of the linking portion to the rotational center of the lower end of the second supporting piece acts on the linking portion of the first supporting piece and the second supporting piece. This force is oriented downward than the rotational center of the upper end of the first supporting piece due to the angle formed as above mentioned is an obtuse angle.

Accordingly, with the above force that acts on the rotational center of the linking portion of the first supporting piece and the second supporting piece acting as the force that causes the first supporting piece to rotate downward, the linking portion is caused to retract from the receiving portion and the container having the protrusion and recess pattern on the side surface can smoothly be taken out from the receiving portion of the holder main body. Further, since the supporting member is configured of the two-link structure including the first supporting piece and the second supporting piece, the shape of the supporting member changes. Due to this, the linking portion of the first supporting piece and the second supporting piece retracts from the receiving portion of the holder main body without the supporting member being significantly protruded outside of the holder main body. Accordingly, the supporting member hardly interferes with other members around the holder main body. Further, since the shape of the supporting member changes according to the shape of the container, adaptivity to containers with a large variety of shapes is high.

(2) In the cup holder of the present invention described in the above (1), preferably, when the container inserted in the receiving portion of the holder main body is taken out from the receiving portion, the container makes contact with an upper end side of the second supporting piece divided by a bisector that bisects the line connecting the rotational center of the linking portion and the rotational center of the lower end of the second supporting piece.

According to such a configuration, the container makes contact with the upper end side of the second supporting piece divided by the bisector that bisects the line between the rotational centers of the second supporting piece. The rotational center of the lower end of the second supporting piece is more likely to slide upward as the force acting on the second supporting piece from the container is closer to the lower end side of the second, supporting piece. When the rotational center of the lower end of the second supporting piece slides upward, the linking portion of the first supporting piece and the second supporting piece advances in the direction approaching the center axis of the holder main body, so the protrusion and recess pattern on the side surface of the container becomes more easily caught by the supporting member. On the other hand, as the force acting on the second supporting piece from the container is closer to the upper end side of the second supporting piece, the rotational center of the lower end of the second supporting piece becomes more unlikely to slide upward. Thus, according to the present invention, upon taking the container having the protrusion and recess pattern on the side surface out of the receiving portion of the holder main body, since the linking portion of the first supporting piece and the second supporting piece does not so easily advance in the direction approaching the center axis of the holder main body, the container can more smoothly be taken out of the receiving portion.

(3) In the cup holder of the present invention described in the above (1) preferably, two supporting members are arranged around the center axis of the holder main body with an interval having an angle difference of 60 to 120 degrees.

According to such a configuration, by the two supporting members being arranged around the center axis of the holder main body with the interval having the angle difference of 60 to 120 degrees, the side surface of the container inserted into the receiving portion of the holder main body is supported by the two supporting members and an inner circumferential surface of the holder main body. At this occasion, since an orientation of each force acting on the side surface of the container from the respective one of the two supporting members, as well as an orientation of a force acting on the side surface of the container from the inner circumferential surface of the holder main body are in three directions that significantly differ from one another, the container inserted in the receiving portion can be retained in a stable state.

According to the cup holder of the present invention, in the cup holder having one or two supporting members arranged in a circumferential direction of the holder main body and supporting the side surface of the container, the container having the protrusion and recess pattern on the side surface can smoothly be taken out from the receiving portion. Further, when the supporting member retracts from the receiving portion, the supporting member hardly interferes with other members around the holder main body.

DESCRIPTION OF EMBODIMENTS

Figures 1, 2:
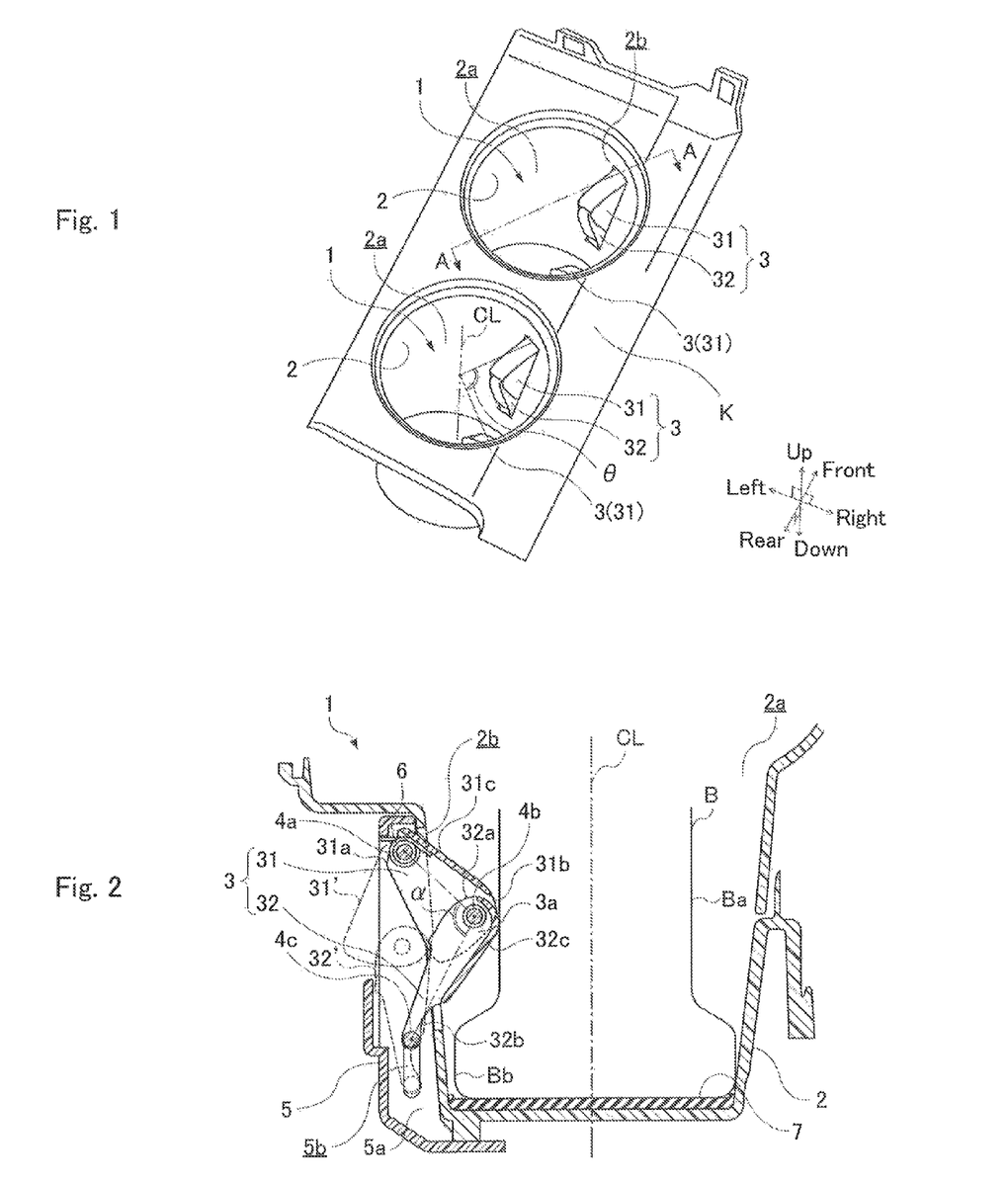
FIG. 1 is a perspective diagram of a cup holder of an embodiment.
FIG. 2 is a cross sectional diagram of the cup holder of the embodiment taken along an A-A line in FIG. 1, and shows a state in which a beverage container is retained.

An embodiment of a cup holder of the present invention will be described in detail with reference to FIGS. 1 to 5. FIG. 1 shows a perspective diagram of a cup holder 1. FIG. 2 is a cross sectional diagram of the cup holder 1 taken along an A-A line in FIG. 1, and shows a state in which a beverage container B is inserted into a receiving portion. 2a of a holder main body 2. As shown in FIG. 1, two cup holders 1 are arranged next to each other in a front and rear direction at a center console in a passenger compartment of an automobile. The two cup holders 1 have an identical configuration. Note that, front and rear described in FIG. 1 respectively indicate a forward direction and a backward direction of the automobile, and right and left respectively indicate a right side and a left side as seen from the passenger.

The cup holder 1 includes the holder main body 2 for receiving the beverage container B, two supporting members 3 for retaining the beverage container B in a stable state, an attaching member 5 for attaching the supporting members 3 to the holder main body 2, and torsion springs 6 (biasing member) for causing the supporting members 3 to advance into a receiving portion 2a. The beverage container B inserted into the receiving portion 2a of the holder main body 2 is supported with its side surface by the two supporting members 3 and an inner circumferential surface of the holder main body 2.

The holder main body 2 is made of composite resin, and has a bottomed cylindrical shape that includes the inner circumferential surface and a bottom surface. The beverage container B is inserted into the receiving portion 2a from an upper opening of the holder main body 2. The receiving portion 2a gradually reduces its diameter from its upper side toward its lower side, and a cushion rubber 7 is placed on the bottom surface of the receiving portion 2a. Rectangular openings 2b that are elongated in an up and down direction for arranging the supporting members 3 are provided at two positions on the holder main body 2 in a circumferential direction. The two openings 2b are formed at positions with an interval having an angle difference θ of about 90 degrees around a center axis CL of the holder main body 2 (see FIG. 1).

As shown in FIG. 1, when the holder main body 2 exhibiting a round planar shape is arranged on a casing member K exhibiting a rectangular planar shape, a space is formed between each corner of the casing member K and an outer circumferential surface of the holder main body 2 as seen from above. In the present embodiment the openings 2*b* for arranging the supporting members 3 are formed at the positions facing these spaces along the circumferential direction of the holder main body 2. Due to this, interference of the supporting members 3 and other members around the holder main body 2 can be avoided.

Each supporting member 3 is configured of a two-link structure of a first supporting piece 31 forming an upper structure of the supporting member 3 and a second supporting piece 32 forming a lower structure of the supporting member 3 (detailed structure will be described later). FIG. 2 shows a state in which a linking portion 3*a* of the first supporting piece 31 and the second supporting piece 32 is at a most advanced position where the linking portion 3*a* is advanced to the maximum into the receiving portion 2*a*. By each supporting member 3 being bent in a dog legged shape at the linking portion 3*a* and the linking portion 3*a* passing through the opening 2*b* to advance into the receiving portion 2*a*, the side surface of the container with a small diameter can be supported by the supporting members 3. When the container with a large diameter is inserted into the receiving portion 2*a* of the holder main body 2, the supporting members 3 retract from the receiving portion 2*a* by being pushed by the side surface of the container, in a state in which the supporting members 3 are at their most retracted positions where the supporting members 3 are retracted to their maximum from the receiving portion 2*a*, the first supporting piece 31 and the second supporting piece 32 retract to positions of a first supporting piece 31' and a second supporting piece 32' shown by broken lines.

The attaching member 5 exhibits a vertically long box shape that is elongated in the up and down direction, and is attached to an outer circumference of the holder main body so as to hide the openings 2*b* of the holder main body 2 from an outside of the holder main body 2. The supporting members 3 are attached to the holder main body 2 via the attaching member 5. In the state in which each supporting member 3 is at the most retracted position, more than half of an entirety of the first supporting piece 31 and substantially an entirety of the second supporting piece 32 are housed within an inner space of the attaching member 5. At this occasion, a part of the first supporting piece 31 is protruded to the outside of the attaching member 5. On the other hand, in the state in which each supporting member 3 is at the most advanced position, more than half of the entirety of the first supporting piece 31 and more than half of the entirety of the second supporting piece 32 are exposed from the inner space of the attaching member 5. The attaching member 5 includes a pair of sidewalls 5*a* that are elongated in the up and down direction (only one of the sidewalls 5*a* is shown in FIG. 2). An elongated hole 5*b* (restricting member) is formed at the lower side of each of the pair of sidewalls 5*a*.

Each first supporting piece 31 exhibits an arm shape, and includes a first rotational shaft 4*a* (rotational center) that extends horizontally at an upper end 31*a*. The first rotational shaft 4*a* is retained rotatably by a bearing that is not shown and formed on each sidewall 5*a* of the attaching member 5. Accordingly, the first supporting piece 31 can rotate in the up and down direction with the first rotational shaft 4*a* as a center. A bearing that is not shown for linking with the second supporting piece 32 is formed at a lower end 31*b* of each first supporting piece 31. A surface of each first supporting piece 31 that faces the receiving portion 2*a* of the holder main body 2 is a contacting surface 31*c* that makes contact with the beverage container B when the beverage container B is inserted into the receiving portion 2*a*.

Each second supporting piece 32 exhibits an arm shape, and includes a second rotational shaft 4*b* (rotational center) that extends horizontally at an upper end 32*a*. The second rotational shaft 4*b* is retained rotatably by a bearing that is not shown and formed on the lower end 31*b* of the first supporting piece 31. Accordingly, the first supporting piece 31 and the second supporting piece 32 are linked to be rotatable in the up and down direction relative to each other with the second rotational shaft 4*b* at a center. Each second supporting piece 32 includes a third rotational shaft 4*c* (rotational center) that extends horizontally at a lower end 32*b*. The third rotational shafts 4*c* are retained rotatably and slidably in the up and down direction by a pair of elongated holes 5*b* formed on the attaching member 5. Thus, sliding directions and elevating heights of the lower ends 32*b* of the second supporting pieces 32 are restricted by the pair of elongated holes 5*b*. A surface of each second supporting piece 32 that faces the receiving portion 2*a* of the holder main body 2 is a contacting surface 32*c* that makes contact with the beverage container B when the beverage container B is taken out from the receiving portion 2*a*.

When the supporting member 3 moves from the most advanced position where the linking portion 3*a* is advanced into the receiving portion 2*a* to the maximum to the most retracted position where the linking portion 3*a* is retracted from the receiving portion 2*a* to the maximum, the first supporting piece 31 does not protrude downward in a direction approaching the center axis CL of the holder main body 2 than the second supporting piece 32. Accordingly, in taking the beverage container B out of the receiving portion 2*a*, the beverage container B does not make contact with the first supporting pieces 31, but only makes contact with the contacting surfaces 32*c* of the second supporting pieces 32.

A torsion spring 6 is arranged around the first rotational shaft 4*a* of each first supporting piece 31. One end of the torsion, spring 6 is fixed to the attaching member 5, and the other end is fixed to the first supporting piece 31. Each torsion spring 6 biases the first supporting piece 31 in a direction that causes the first supporting piece 31 to rotate counter-clockwise in FIG. 2 and be flipped up. Accordingly, in a state in which the beverage container B is not inserted into the cup holder 1, each supporting member 3 is biased at the most advanced position where the linking portion 3*a* is advanced to the maximum into the receiving portion 2*a* and the lower end 32*b* of the second supporting piece 32 is elevated to the maximum. In the state in which the supporting members 3 are biased at their most advanced positions, as shown in FIG. 2, an angle α formed by a chain line from the second rotational shaft 4*b* to the first rotational shaft 4*a* and a chain line from the second rotational shaft 4*b* to the third rotational shaft 4*c* is an obtuse angle.

An operation of the cup holder 1 will be described with reference to FIG. 2 to FIG. 5. The beverage container B includes a small diameter portion Ba having a small outer diameter, and a large diameter portion Bb having a large outer diameter below the small diameter portion Ba. Due to this, as shown in FIG. 2, a large step resides between the small diameter portion Ba and the large diameter portion Bb of the beverage container B. The linking portion 3*a* of each supporting member 3 supports the small diameter portion Ba of the beverage container B from a lateral side.

Figure 3:
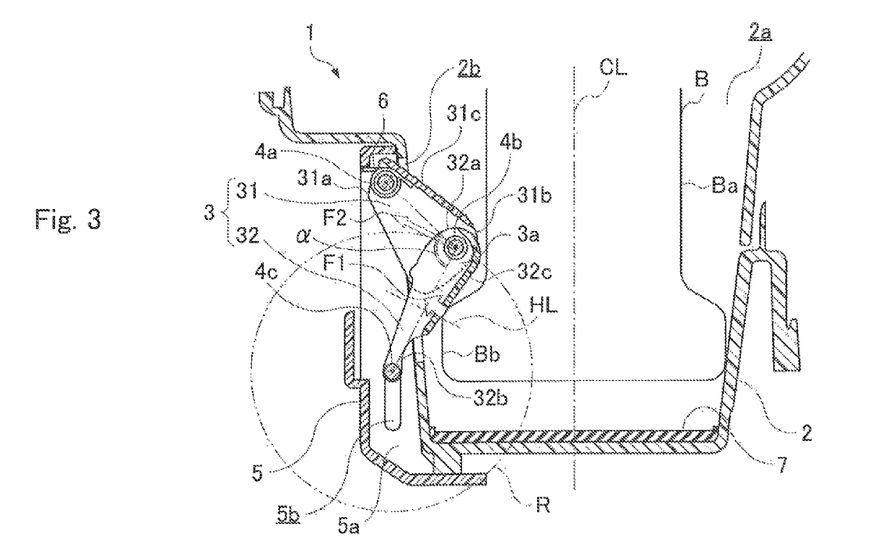
FIG. 3 is a cross sectional diagram of the cup holder of the embodiment, and shows a first state when the beverage container is taken out.

When the beverage container B begun to be taken out from the cup holder 1, as a first state, as shown in FIG. 3, an upper end of the large diameter portion Bb of the beverage container B makes contact with the contacting surfaces 32c of the second supporting pieces 32. At this occasion, the beverage container B makes contact with an upper end 32a side of the second supporting piece 32 that is divided by a bisector HL that bisects the chain line connecting the second rotational shaft 4b and the third rotational shaft 4c. Then, an obliquely upward force F1 acts on the second supporting pieces 32 from the beverage container B.

Since the force F1 acts on each contacting surface 32c at substantially right angles thereto, a direction of the force F1 differs depending on an inclination of the contacting surface 32c. However, since the lower ends 32b of the second supporting pieces 32 are in the state of being restricted of their elevation by the pair of elongated holes 5b, each second supporting piece 32 moves to rotate about the third rotational shaft 4c irrelevant to the direction of the force F1. Moreover, a force F2 that is perpendicular and upward relative to the chain line from the second rotational shaft 4b to the third rotational shaft 4c acts on the second rotational shaft 4b at the linking portion 3a of each supporting member 3. That is, the force F2 acts in a tangential direction of the second rotational shaft 4b in a circle R that passes through second rotational shaft 4b with the third rotational shaft 4c as a center.

Figure 4:
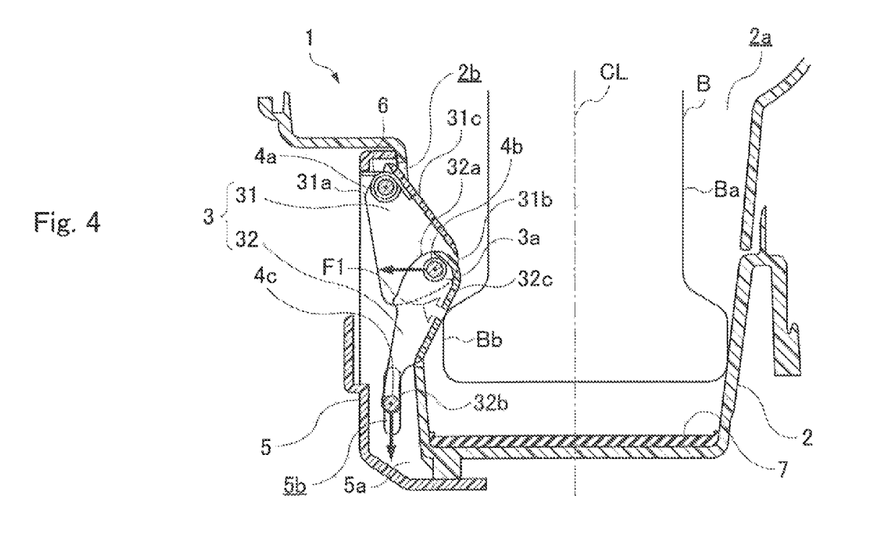
FIG. 4 is a cross sectional diagram of the cup holder of the embodiment, and shows a second state when the beverage container is taken out.

The force F2 is oriented downward than the first rotational shaft 4a provided at the upper end 31a of the first supporting piece 31 due to the above-described angle α being an obtuse angle. Accordingly, the force F2 acts as a force that causes the first supporting piece 31 to rotate downward. As above, when the beverage container B is continued to be taken out from the receiving portion 2a against the biasing force of the torsion springs 6 after a state in which the first supporting pieces 31 can easily be rotated downward is obtained, as a second state, as shown in FIG. 4, the beverage container B can be lifted while an upper end of the large diameter portion Bb of the beverage container B is caused to slide in contact with the contacting surfaces 32c of the second supporting pieces 32. At this occasion, by the force F1 acting obliquely upward on the second supporting pieces 32 from the beverage container B, the linking portions 3a retract from the receiving portion 2a as the third rotational shafts 4c at the lower ends 32b of the second supporting pieces 32 descend along the elongated holes 5b.

Further, when the beverage container B is further continued to be taken out from the receiving portion 2a, the large diameter portion Bb of the beverage container B causes the linking portions 3a to further retract, and as shown in FIG. 5, a third state in which the large diameter portion Bb slides in contact from the lateral side to the contacting surfaces 32c of the second supporting pieces 32 is obtained. Then, the beverage container B is completely taken out from the receiving portion 2a.

According to such a configuration of the present embodiment, when the supporting members 3 operate, the first supporting pieces 31 do not protrude downward in the direction approaching the center axis CL of the holder main body 2 than the second supporting pieces 32. Thus, when the beverage container B inserted in the receiving portion 2a of the holder main body 2 is taken out from the receiving portion 2a, the side surface of the beverage container B makes contact with the contacting surfaces 32c of the second supporting pieces 32 from the lateral side or from the lower side regardless of the protrusion and recess pattern on the side surface of the beverage container B. Further, according to the configuration of the present embodiment, when the lower end 32b of each second supporting piece 32 is elevated to the maximum and the linking portion 3a is advanced to the maximum, the angle α formed by the chain line from the second rotational shaft 4b to the first rotational shaft 4a and the chain line from the second rotational shaft 4b to the third rotational shaft 4c is an obtuse angle.

Thus, according to the present embodiment, in the case of taking the beverage container B out from the receiving portion 2a of the holder main body 2 while the supporting members 3 are at the most advanced positions, the side surface of the beverage container B makes contact with the second supporting pieces 32 from the lateral side or the lower side under the state in which the elevation of the lower ends 32b of the second supporting pieces 32 is restricted by the pair of elongated holes 5b. At this occasion, each second supporting piece 32 acts to rotate about the third rotational shaft 4c at the lower end 32b of the second supporting piece 32 irrelevant to the direction of the force F1 acting on the second supporting piece 32 from the beverage container B. Moreover, the force F2 that is perpendicular and upward relative to the chain line from the second rotational shaft 4b to the third rotational shaft 4c acts on the second rotational shaft 4b at the linking portion 3a of each supporting member 3. The force F2 is oriented downward than the first rotational shaft 4a provided at the upper end 31a of each first supporting piece 31 due to the above-described angle α being an obtuse angle.

Accordingly, by the force F2 acting on the second rotational shaft 4b of each supporting member 3 acting as the force that causes the first supporting piece 31 to rotate downward, the linking portion 3a of the supporting member 3 is caused to retract from the receiving portion 2a, and the beverage container B having the protrusion and recess pattern on the side surface can smoothly be taken out from the receiving portion 2a of the holder main body 2. Further, since each supporting member 3 is configured of the two-link structure of the first supporting piece 31 and the second supporting piece 32, the shape of the supporting member 3 changes. Due to this, the linking portion 3a of each supporting member 3 retracts from the receiving portion 2a of the holder main body 2 without the supporting member 3 being significantly protruding to the outside of the holder main body 2. Thus, the supporting members 3 hardly interfere with the other members around the holder main body 2. Further, since the shape of the supporting member 3 changes in accordance with the shape of the container to be inserted into the receiving portion 2, adaptivity to containers having a large variety of shapes is high.

Further, according to the configuration of the present embodiment, the beverage container B makes contact with the upper end 32a side of each second supporting piece 32 divided by the bisector HL that bisects the chain line connecting the second rotational shaft 4b and the third rotational shaft 4c. As the force F1 acting on the second supporting piece 32 from the beverage container B is closer to the upper end 32a side of the second supporting piece 32, the third rotational shaft 4c that is the rotational center of the lower end 32b of the second supporting piece 32 becomes more unlikely to slide upward. Thus, according to the present embodiment, upon taking the beverage container B having the protrusion and recess pattern on the side surface out of the receiving portion 2a of the holder main body 2, since the linking portion 3a of the first supporting piece 31 and the second supporting piece 32 does not so easily advance in the direction approaching the center axis CL of the holder main body 2, the beverage container B can more smoothly be taken out of the receiving portion 2a.

Further, according to the configuration of the present embodiment, two supporting members 3 are arranged around the center axis CL of the holder main body 2 with the interval having the angle difference θ of about 90 degrees. Thus, the side surface of the beverage container B inserted into the receiving portion 2a of the holder main body 2 is supported by the two supporting members 3 and the inner circumferential surface of the holder main body 2. Due to this, since the orientation of each force acting on the side surface of the beverage container B from the respective one of the two supporting members 3, as well as the orientation of the force acting on the side surface of the beverage container B from the inner circumferential surface of the holder main body 2 are in three directions that significantly differ from one another, the beverage container B inserted in the receiving portion 2a can be retained in the stable state.

The cup holder of the present invention is not limited to the above described embodiment, and it goes without saying that it can be implemented in various embodiments to which changes, improvements and the like that a person skilled in the art would make are made within a scope that does not go beyond the gist of the present invention.

For example, in the present embodiment, two supporting members 3 are arranged around the center axis CL of the holder main body 2 with the interval having the angle difference θ of about 90 degrees. However, the angle difference θ by which the container inserted in the receiving portion 2a can be retained in the stable state is not limited to about 90 degrees, and the angle difference θ may be set within a range of 60 to 120 degrees. Further, depending on the shape or weight of the container to be inserted into the receiving portion 2a, and the shape (depth, inner diameter and the like) of the receiving portion 2a, there are cases in which the container inserted into the receiving portion 2a can be retained in the stable state with only one supporting member 3 arranged in the holder main body 2.

Further, in the present embodiment, the torsion spring 6 is arranged around each first rotational shaft 4a as the biasing member that causes the linking portion 3a of the first supporting piece 31 and the second supporting piece 32 to advance in the direction approaching the center axis CL of the holder main body 2. However, the biasing member may be arranged at a different position from the present invention by using a flat spring, a tension spring, a compression spring and the like. For example, a torsion spring may be arranged around the second rotational shaft 4b, one end of the torsion spring may be fixed to the first supporting piece 31, and the other end thereof may be fixed to the second supporting piece 32. Further, a flat spring that is bent in a doglegged shape may be arranged in the vicinity of the second rotational shaft 4b across the first supporting piece 31 and the second supporting piece 32. Further, intermediate portions of the first supporting piece 31 and the second supporting piece 32 may be linked by a tension spring. Further, a compression spring for biasing the third rotational shaft 4c upward may be arranged below the third rotational shaft 4c.

The invention claimed is:

1. A cup holder comprising:
a holder main body including a receiving portion that opens at an upper side and into which a container is to be inserted;
one or two supporting members arranged in a circumferential area of the holder main body and supporting a side surface of the container when advancing into the receiving portion;
a restricting member; and
a biasing member, wherein:
each supporting member comprises:
a first supporting piece forming an upper structure of each supporting member and having an upper end arranged to be rotatable relative to the holder main body;
a second supporting piece forming a lower structure of each supporting member and having an upper end linked to be rotatable relative to a lower end of the first supporting piece, the second supporting piece including a lower end arranged to be rotatable relative to the holder main body and slidable in an up and down direction relative to the holder main body; and
a linking portion rotatably connecting the lower end of the first supporting piece and the upper end of the second supporting piece of each supporting member;
the restricting member restricts a sliding direction and an elevating height of the lower end of the second supporting piece;
the biasing member biases the linking portion connecting the first supporting piece and the second supporting piece to advance in an inward direction approaching a center axis of the holder main body, wherein the first supporting piece does not protrude in the inward direction approaching the center axis of the holder main body more than the second supporting piece; and
when the lower end of the second supporting piece is elevated to its maximum and the linking portion is advanced inward to its maximum, an obtuse angle is formed between first and second lines respectively corresponding to the first and second support pieces, the first line extending from a rotational center of the linking portion to a rotational center of the upper end of the first supporting piece and the second line extending from the rotational center of the linking portion to a rotational center of the lower end of the second supporting piece.

2. The cup holder according to claim 1, wherein when the container inserted in the receiving portion of the holder main body is taken out from the receiving portion, the container contacts an upper end side of the second supporting piece divided by a bisector that bisects the second line connecting the rotational center of the linking portion and the rotational center of the lower end of the second supporting piece.

3. The cup holder according to claim 1, wherein two supporting members are arranged around the center axis of the holder main body with an interval having an angular difference of 60 to 120 degrees.

4. The cup holder according to claim 1, wherein when the linking portion retracts from its maximum advanced position, the linking portion is lowered and the lower end of the second support piece is elevated to its maximum position, and the obtuse angle formed between the first and second lines corresponding to the first and second supporting devices is maintained.

* * * * *